(12) United States Patent
Hessing et al.

(10) Patent No.: US 8,388,000 B2
(45) Date of Patent: Mar. 5, 2013

(54) CONTROL ARM, AND METHOD OF PRODUCING A CONTROL ARM

(75) Inventors: Florian Hessing, Paderborn (DE); Stephan Meyer, Bielefeld (DE); Oliver Mielke, Altenbeken (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 79 days.

(21) Appl. No.: 13/023,126

(22) Filed: Feb. 8, 2011

(65) Prior Publication Data

US 2011/0198821 A1    Aug. 18, 2011

(30) Foreign Application Priority Data

Feb. 12, 2010    (DE) .......................... 10 2010 007 944

(51) Int. Cl.
*B60G 3/04* (2006.01)
*B21D 53/88* (2006.01)

(52) U.S. Cl. ................................ 280/124.134; 29/897.2

(58) Field of Classification Search ........... 280/124.121, 280/124.125, 124.134, 124.135, 124.138, 280/124.143, 124.15, 124.153; 29/897.2
See application file for complete search history.

(56) References Cited

U.S. PATENT DOCUMENTS

| | | | |
|---|---|---|---|
| 4,473,241 A * | 9/1984 | von der Ohe et al. | 280/781 |
| 5,348,334 A * | 9/1994 | Giltinan | 280/124.138 |
| 5,662,349 A | 9/1997 | Hasshi et al. | |
| 5,695,213 A * | 12/1997 | Nakamura et al. | 280/124.134 |
| 6,006,568 A | 12/1999 | Bihrer | |
| 6,442,820 B1 * | 9/2002 | Mason | 29/421.1 |
| 7,140,624 B2 * | 11/2006 | Gerrard | 280/124.135 |
| 7,273,219 B2 | 9/2007 | Michel et al. | |
| 7,506,444 B2 * | 3/2009 | Weise | 29/897.2 |
| 8,291,595 B2 * | 10/2012 | Runte et al. | 29/897.2 |
| 2004/0135337 A1 * | 7/2004 | Alesso et al. | 280/124.134 |
| 2006/0151970 A1 * | 7/2006 | Kaminski et al. | 280/124.134 |

FOREIGN PATENT DOCUMENTS

| | | |
|---|---|---|
| DE | 195 26 562 C2 | 2/1996 |
| DE | 199 12 498 A1 | 9/1999 |
| DE | 10 2006 060 898 | 6/2008 |
| WO | WO 2004/002761 | 1/2004 |

\* cited by examiner

*Primary Examiner* — Joseph Rocca
(74) *Attorney, Agent, or Firm* — Henry M. Feiereisin LLC

(57) ABSTRACT

A control arm for installation to an axle of a motor vehicle includes a base body made of sheet metal and having three bearing zones. The base body has two suspension arms to define a base body plane. One of the bearing zones includes two bearing receptacles, each having a receiving opening disposed in an opening plane. The opening plane of one of the receiving openings and the opening plane of the other one of the receiving openings are disposed in spaced-apart relationship and oriented in substantial perpendicular relationship to the base body plane.

15 Claims, 2 Drawing Sheets

CONTROL ARM, AND METHOD OF PRODUCING A CONTROL ARM

CROSS-REFERENCES TO RELATED APPLICATIONS

This application claims the priority of German Patent Application, Serial No. 10 2010 007944.8-21, filed Feb. 12, 2010, pursuant to 35 U.S.C. 119(a)-(d), the content of which is incorporated herein by reference in its entirety as if fully set forth herein.

BACKGROUND OF THE INVENTION

The present invention relates, in general, to the field of wheel suspensions, and more particularly to a control arm for installation to an axle of a motor vehicle.

The following discussion of related art is provided to assist the reader in understanding the advantages of the invention, and is not to be construed as an admission that this related art is prior art to this invention.

Control arms are used in automobile construction to guide and steer the wheels. The control arm provides on one side the connection with the bearing arrangement of the wheel and on the other side the connection with the vehicle body. In addition to the wheel bearing and the driveshaft, the bearing arrangement includes i.a. also a swivel bearing, a connection with the steering knuckle and with the guide joint, with the steering tie rod as well as further elements for the steering, drive, suspension, and brake of the vehicle.

During operation of the vehicle, the control arm is subject to various stress. For that reason, each wheel is oftentimes provided with more than one control arm. Another approach involves the presence of a particularly solid and stable construction to enable the control arm to cope with the high stress. This approach results, however, in increased weight, causing rising fuel consumption. To address the problem of weight, materials of especially high strength or combinations of different materials can be used. For example, the bearing attachment zones which are especially exposed to stress can be made from cast parts or milled parts which are connected to a base body of steel sheet. This hybrid construction is disadvantageous because of the need to join the various components with one another, thereby adversely affecting production costs.

Service life of a control arm and thus safety of a vehicle is an important consideration when constructing and designing the control arm. Care should be taken in particular to the design of connection zones between different components, when a hybrid control arm is involved.

It would be desirable and advantageous to provide an improved control arm which obviates prior art shortcomings and which is lightweight and easy to produce while still being reliable in operation and having a long service life.

SUMMARY OF THE INVENTION

According to one aspect of the present invention, a control arm for installation to an axle of a motor vehicle includes a base body made of sheet metal and having three bearing zones, with the base body having two suspension arms to define a base body plane, one of the bearing zones including two bearing receptacles, each having a receiving opening disposed in an opening plane, with the opening plane of one of the receiving openings and the opening plane of the other one of the receiving openings disposed in spaced-apart relationship and oriented in substantial perpendicular relationship to the base body plane.

According to another advantageous feature of the present invention, the receiving openings can have a round inner contour for receiving bearings respectively. The bearings may hereby be press-fitted into the receiving openings.

According to another advantageous feature of the present invention, the receiving openings of the bearing receptacles are disposed in substantial parallel relationship. The presence of two bearing receptacles, each having a receiving opening, enables a bearing to absorb substantial forces as the forces can be transmitted by the bearing receptacles into the control arm via a transition zone. The transition zone can be provided with reinforcements to further stiffen the bearing zone. This can be realized, for example, by providing embossments or indentations which extend from the transition zone into the base body.

The presence of two bearing receptacles also restrains the control arm against rotation in the attachment zone. In the description, the reference to "receiving openings in parallel opposite relationship" is to be understood within the scope of the invention as an axially symmetrical, i.e. aligned disposition of the receiving openings. When press-fitting a bearing, the aligned disposition of the receiving openings is wanted to simplify installation of a bearing sleeve during the manufacture. The axis symmetry is also relevant for positioning the bearing. The presence of receiving openings of round inner contour is hereby of advantage. Examples of a press-fitted bearing include a hydrobearing or a bearing of elastomeric material. As a result of the perpendicular disposition of the opening plane of the bearing receptacle in relation to the base body plane, the bearing can be installed horizontally. The rotation direction of the bearing that is connected to the control arm lies essentially in a plane defined by the X and Y axes of the vehicle coordinate system, with the X axis pointing in travel direction and the Y axis pointing transversely to the travel direction. Depending on the positioning of the control arm and the thus predefined rotation direction, the rotation axis of the bearing can be arranged at an angle of 0° to 60° in relation to the X and Y planes and in relation to the base body plane. The angle may be variable.

According to another advantageous feature of the present invention, each receiving openings can have a collar. The collar is easy to make. The collar may have a rounded transition zone towards the base body plane. As a bearing is press-fitted into the bearing receptacle, the collar can serve as a centering aid for the installation of the bearing. The collar provides hereby a bearing receptacle surface. Thus, for example, a bearing with external bearing sleeve can be press-fitted, or the collar may be sized long enough to serve by itself as bearing sleeve.

According to another advantageous feature of the present invention, the collar of the one of the receiving openings and the collar of the other one of the receiving openings can be oriented in a same direction or in opposite directions. Configuring the collars in a same direction has the advantage that the collars can be made by a single forming mandrel during production. Moreover, the receiving openings can be accurately positioned with precise axis symmetry. There is no need to execute a separate calibration to provide an aligned disposition of the receiving openings. When configuring the collars in opposite directions, the overall size becomes compact, when the collars point inwards. When the collars point outwards, a bearing that is sized relatively broad in relation to the receiving zone can be guided in an especially precise manner.

According to another aspect of the present invention, a method of making a control arm for installation to an axle of a motor vehicle includes the steps of producing from a sheet metal blank a single-piece member having a base body with three bearing zones, shaping the single-piece member in a forming tool to provide one of the bearing zones with two bearing receptacles, and shaping each of the bearing receptacles with a receiving opening disposed in an opening plane, with the opening plane of one of the receiving openings and the opening plane of the other one of the receiving openings disposed in spaced-apart relationship and oriented in substantial perpendicular relationship to the base body plane.

The manufacture of a control arm according to the present invention from a single-piece sheet metal blank is easy to implement and the manufactured control arm has a long service life while being lightweight. The manufacture is cost-efficient because the entire forming process can be implemented with a single chucking.

According to another advantageous feature of the present invention, the sheet metal blank can be formed with two limbs in which the collars for receiving a bearing can be provided. The receiving openings may hereby be realized beforehand by appropriately punching the sheet metal blank. As an alternative, the receiving openings may also be formed directly in the forming tool with the collars, using a pull-through tool.

According to another advantageous feature of the present invention, the limbs can be bent by the forming tool. The sheet metal blank may also be placed in a chucking and formed with the bearing receptacle in the bearing zone in one piece. As a result, this bearing zone thus involves a single bearing zone with two bearing receptacles, each having a receiving opening. The presence of bent limbs establishes a bearing zone of substantially U-shaped cross section. The wall thickness of the sheet metal blank is variable and the sheet metal blank may have areas of different wall thicknesses.

According to another advantageous feature of the present invention, the limbs can be formed by the forming tool or an auxiliary tool such that the receiving openings of the bearing receptacles are disposed in substantial parallel relationship. As a result, the receiving openings are disposed axis-symmetrical for press-fitting a bearing or bearing sleeve. When forming the limbs with the forming tool and providing the receiving openings or collars beforehand, refinishing is necessary with the use of a positioning gauge. When shaping the limbs with the forming tool and providing the receiving openings and collars with an auxiliary tool, the auxiliary tool constitutes in this case the positioning gauge.

According to another advantageous feature of the present invention, the control arm can be manufactured through cold forming and subsequent quenching and tempering, or through hot forming and subsequent press hardening. The bearing receptacle can be hardened in one piece via the transition zone with the base body to provide the control arm with an especially high stiffness.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
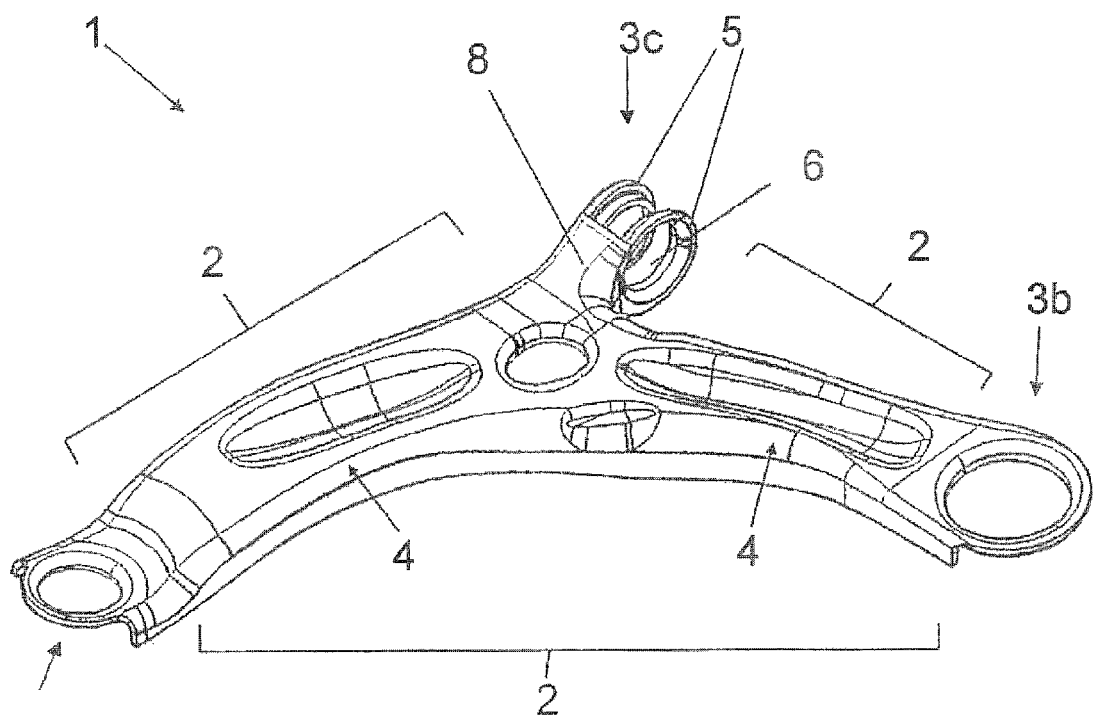
FIG. 1 is a perspective view of a control arm according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective view of a control arm according to the present invention, generally designated by reference numeral 1. The control arm 1 includes a base body 2 having two suspension arms 4 in single-piece construction with three bearing zones 3a, 3b, 3c. The suspension arms 4 define a not shown base body plane in which the base body 2 of the control arm 1 lies. As shown in FIG. 1, the suspension arms 4 are provided with embossments, indentations or openings for reinforcement and stiffening of the base body 2.

The bearing zones 3a, 3b are disposed at the free ends of the suspensions arms 4, respectively, and can be provided, for example, for receiving ball joints (not shown). The bearing zone 3c is arranged at an upper side at the junction of the suspension arms 4 and is made during the forming process of the control arm 1. The bearing zone 3c is thus not a separate component but represents an integral part of the control arm 1.

Figure 2:
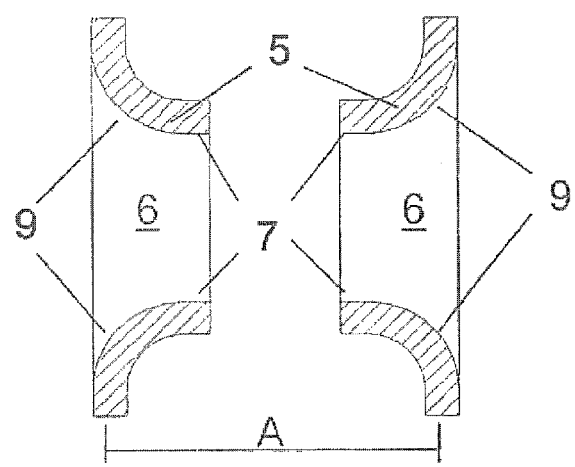
FIG. 2 is an axis-symmetrical cross section of a bearing receptacle of the control arm.

The bearing zone 3c has two bearing receptacles 5. Each bearing receptacle 5 has a round outer contour and a circular receiving opening 6 having a round inner contour for receiving a bearing (FIG. 2). The bearing receptacles 5 are connected via a transition zone 8 with the base body 2 of the control arm 1. The transition zone 8 extends hereby in the form of a funnel from the base body 2 towards the bearing zone 3c and has a substantially U-shaped cross section. This configuration of the transition zone 8 is especially beneficial to conduct bearing forces into the base body 2 because the funnel-shaped configuration of the transition zone 8 prevents the presence of stress peaks.

Figure 3:
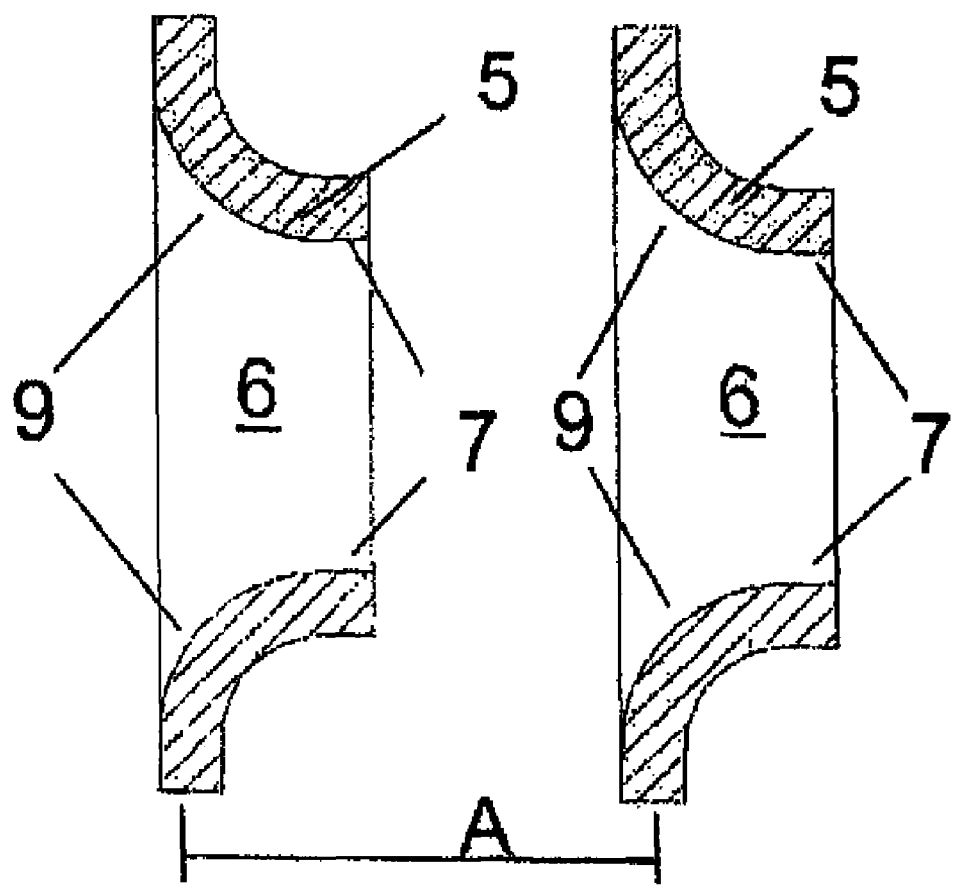
FIG. 3 is an axis-symmetrical cross section of a bearing receptacle of a variation of the control arm.

FIG. 2 shows a cross section of the bearing zone 3c as shown in FIG. 1, with the two bearing receptacles 5 at a distance A in relation to one another. The cross sectional plane lies in the rotation axis of the bearing, as viewed from the base body 2. As can be seen, the receiving openings 6 in the bearing zone 3c are configured as collars 9 which point in opposite directions in the non-limiting example of FIG. 2, with the collars converging to one another. The collars 9 may also point in a same direction, as shown by way of example in FIG. 3.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A control arm for installation to an axle of a motor vehicle, comprising a single-piece base body made of sheet metal and having three bearing zones formed in one piece with the base body, said base body having two suspension arms to define a base body plane, one of the bearing zones including two bearing receptacles in spaced-apart relation, each of the bearing receptacles having a receiving opening disposed in an opening plane, with the opening plane of one of the receiving openings and the opening plane of the other one of the receiving openings disposed in spaced-apart relationship and oriented in substantial perpendicular relationship to the base body plane, said base body having a transition zone formed in one piece with the suspension arms and the two bearing receptacles for transmitting a force from the bearing receptacles into the base body, said transition zone being sized to extend from one of the bearing receptacles to the other one of the bearing receptacles.

2. The control arm of claim 1, wherein the receiving openings have a round inner contour.

3. The control arm of claim 1, wherein the receiving openings are disposed in substantial parallel relationship.

4. The control arm of claim 1, wherein the receiving openings each have a collar.

5. The control arm of claim 4, wherein the collar of the one of the receiving openings and the collar of the other one of the receiving openings are oriented in a same direction.

6. The control arm of claim 4, wherein the collar of the one of the receiving openings and the collar of the other one of the receiving openings are oriented in opposite directions.

7. The control arm of claim 1, wherein the transition zone extends in the form of a funnel from the base body towards the one of the bearing zones.

8. The control arm of claim 7, wherein the transition zone has a substantially U-shaped configuration.

9. A method of making a control arm for installation to an axle of a motor vehicle, comprising the steps of:
producing from a sheet metal blank a single-piece member having a base body with three bearing zones, said base body having two suspension arms;
shaping the single-piece member in a forming tool to provide one of the bearing zones with two bearing receptacles and a transition zone for transmitting a force from the bearing receptacles into the base body, said transition zone being sized to extend from one of the bearing receptacles to the other one of the bearing receptacles; and
shaping each of the bearing receptacles with a receiving opening disposed in an opening plane, with the opening plane of one of the receiving openings and the opening plane of the other one of the receiving openings disposed in spaced-apart relationship and oriented in substantial perpendicular relationship to the base body plane.

10. The method of claim 9, further comprising the steps of providing the sheet metal blank with two limbs, and forming the limbs to establish collars in the area of the receiving openings.

11. The method of claim 10, wherein the limbs are bent by the forming tool.

12. The method of claim 10, wherein the limbs are formed by the forming tool or an auxiliary tool such that the receiving openings of the bearing receptacles are disposed in substantial parallel relationship.

13. The method of claim 9, wherein the shaping steps are realized through cold forming and subsequent quenching and tempering.

14. The method of claim 9, wherein the shaping steps are realized through hot forming and subsequent press hardening.

15. The method of claim 9, wherein the shaping step of the bearing receptacles is implemented with an auxiliary tool while the single-piece member is in a chucking of the forming tool.

* * * * *